(12) United States Patent
Watanabe et al.

(10) Patent No.: US 8,606,480 B2
(45) Date of Patent: Dec. 10, 2013

(54) VEHICLE TRAVEL AMOUNT ESTIMATION DEVICE AND OBSTACLE DETECTION DEVICE

(75) Inventors: Takayuki Watanabe, Iwaki (JP); Daishi Mori, Iwaki (JP); Kenji Shida, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 13/612,080

(22) Filed: Sep. 12, 2012

(65) Prior Publication Data

US 2013/0151029 A1      Jun. 13, 2013

(30) Foreign Application Priority Data

Dec. 13, 2011   (JP) .................................. 2011-272116

(51) Int. Cl.
*G05D 1/00*      (2006.01)
*G06K 9/00*      (2006.01)

(52) U.S. Cl.
USPC ............................. 701/96; 382/154; 382/106

(58) Field of Classification Search
USPC ................................. 701/1, 96; 382/154, 106
See application file for complete search history.

(56) References Cited

U.S. PATENT DOCUMENTS

| | | | | |
|---|---|---|---|---|
| 5,689,264 A | * | 11/1997 | Ishikawa et al. ................. | 342/70 |
| 6,169,478 B1 | * | 1/2001 | Hada et al. ..................... | 340/435 |
| 6,259,514 B1 | * | 7/2001 | Yoshida ......................... | 356/3.04 |
| 6,289,281 B1 | * | 9/2001 | Shinmura et al. ............. | 701/301 |
| 6,487,303 B1 | * | 11/2002 | Yamaguchi et al. .......... | 382/103 |
| 6,888,953 B2 | * | 5/2005 | Hanawa ......................... | 382/104 |
| 6,963,657 B1 | * | 11/2005 | Nishigaki et al. ............. | 382/106 |
| 7,782,179 B2 | * | 8/2010 | Machii et al. ................. | 340/435 |
| 8,199,970 B2 | * | 6/2012 | Akiyama ....................... | 382/103 |
| 8,244,027 B2 | * | 8/2012 | Takahashi ..................... | 382/154 |
| 8,428,305 B2 | * | 4/2013 | Zhang et al. .................. | 382/103 |
| 2001/0018640 A1 | * | 8/2001 | Matsunaga ................... | 701/301 |
| 2010/0156616 A1 | * | 6/2010 | Aimura et al. ................ | 340/436 |
| 2010/0202686 A1 | * | 8/2010 | Okawa et al. ................. | 382/165 |
| 2010/0315214 A1 | * | 12/2010 | Yano et al. .................... | 340/435 |
| 2011/0125372 A1 | * | 5/2011 | Ito .................................. | 701/45 |
| 2011/0196592 A1 | * | 8/2011 | Kashi et al. .................... | 701/96 |
| 2012/0106786 A1 | * | 5/2012 | Shiraishi et al. ............. | 382/103 |

FOREIGN PATENT DOCUMENTS

| | | |
|---|---|---|
| JP | 10-222679 | 8/1998 |
| JP | 2009-074861 | 4/2009 |
| WO | WO 2007/142267 | 12/2007 |

* cited by examiner

*Primary Examiner* — Thomas Black
*Assistant Examiner* — Tyler Paige
(74) *Attorney, Agent, or Firm* — Brinks Gilson & Lione

(57) ABSTRACT

A vehicle travel amount estimation device includes a camera, a taken image storing unit, a compensated image storing unit, a travel amount calculation unit, a vehicle speed and gyro sensor, and a travel amount determination unit. The taken image storing unit and the compensated image storing unit store images taken by the camera. The travel amount calculation unit calculates the amount of travel based on two stored images. The sensors detect the amount of travel of the vehicle. The travel amount determination unit is configured to compare a first amount of travel calculated by the travel amount calculation unit with a second amount of travel detected by the vehicle speed sensor or the like in order to determine the first amount of travel to be the amount of travel of the vehicle when the difference between the first amount and the second amount is smaller than a predetermined value.

6 Claims, 3 Drawing Sheets

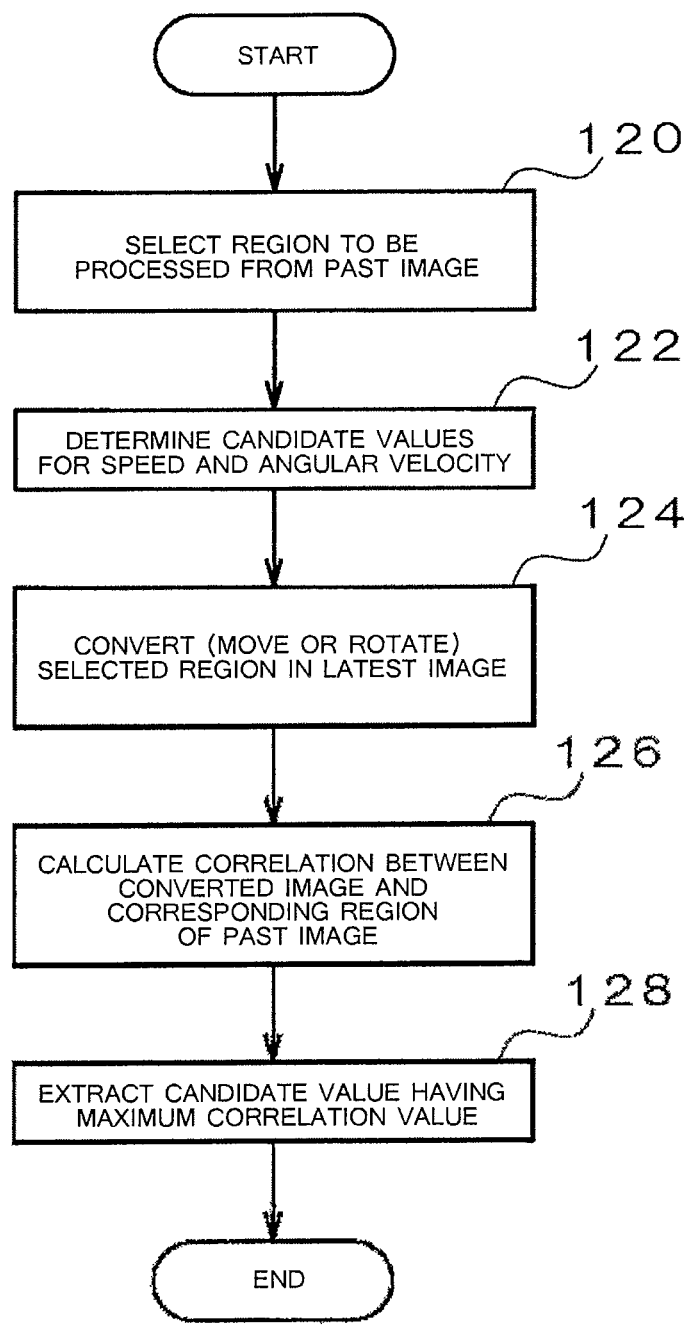

VEHICLE TRAVEL AMOUNT ESTIMATION DEVICE AND OBSTACLE DETECTION DEVICE

PRIORITY CLAIM

This application claims the benefit of Japanese Patent Application No. 2011-272116, filed on Dec. 13, 2011, and which is incorporated by reference herein in its entirety.

1. FIELD OF THE INVENTION

The present invention relates to a vehicle travel amount estimation device and an obstacle detection device. The vehicle travel amount estimation device is configured to estimate the amount of travel of a vehicle using a speed obtained based on a taken image and a speed obtained based on a vehicle speed sensor or the like.

2. BACKGROUND

For example, an image processing apparatus for a vehicle (for example, see Japanese Patent Application Laid-Open No. 10-222679) and an obstacle detection system (for example, see International Publication No. 2007/142267) have been known in the past. The image processing apparatus is configured to detect the amount of travel of a vehicle from the vehicle speed and the yaw rate in order to detect an obstacle using a background differencing technique. The obstacle detection system is configured to detect the amount of travel of a vehicle by processing two camera images that have been taken at different times in order to detect an obstacle using a background differencing technique.

Further, as for the measurement of the amount of travel of a vehicle, a technique has been known (for example, see Japanese Patent Application Laid-Open No. 2009-074861). The technique is a travel amount measurement device configured to measure the amount of travel of a mobile object using a speed obtained based on a taken image and a speed obtained based on the vehicle speed sensor or the like. In the device, when the number of the vehicle speed pulses is one or more, the amount of travel is calculated based on the vehicle speed pulse, and when the number of the vehicle speed pulses is zero, the amount of travel is calculated based on the taken image.

The image processing apparatus for a vehicle disclosed in Japanese Patent Application Laid-Open No. 10-222679 detects, for example, the vehicle speed using the vehicle sensor and the yaw sensor. There is a problem in that the error of the amount of travel of the vehicle is increased because the sensors have low sensitivities when the vehicle runs at low speed.

The obstacle detection system disclosed in International Publication No. 2007/142267 has a problem in that an error in the amount of travel of the vehicle is increased because the accuracy of tracking the feature points included in the image is reduced when the image drastically changes while the vehicle runs at high speed.

Using the technique for measuring the amount of travel disclosed in Japanese Patent Application Laid-Open No. 2009-074861 can solves the problems. In other words, using the amount of travel of the vehicle calculated based on the image when the vehicle runs at low speed and using the amount of travel of the vehicle detected by the vehicle speed sensor or the like when the vehicle runs at high speed can reduce the error at each of the speed ranges.

By the way, to detect an obstacle, the techniques disclosed in Japanese Patent Application Laid-Open No. 10-222679 and International Publication No. 2007/142267 extract the obstacle by comparing an estimated image with the currently-taken image. The estimated image is obtained by moving the vehicle in the past image by the obtained amount of travel of the vehicle. Thus, when the timing when the past image has been taken differs from the timing when the amount of travel of the vehicle has been detected by the vehicle speed sensor or the like, the estimated image includes the error caused by the difference. This causes an error in the obstacle detection.

When it is considered that the amount of travel of a vehicle is calculated based on the image taken by the camera that is actually mounted on the vehicle (this image is also used for calculating an estimated image.), and the amount of travel of a vehicle is also detected using the vehicle speed sensor or the like, the timing when the amount is calculated and the timing when the amount is detected do not necessarily correspond to each other. For example, on the assumption that 7.5 frames of the taken images can obtained per second (7.5 fps), the interval of the calculation of the amount of travel of the vehicle based on the taken image is 133 ms. On the other hand, on the assumption that the timing of the detection by the vehicle sensor or the like is 100 ms, both of the timings are almost always out of synchronization with each other and the amount of the gap changes from moment to moment. Further, on the assumption that the value detected by the vehicle speed sensor or the like is input through a controller area network (CAN), the precise time when the detected value has been obtained through the CAN cannot be found.

In other words, as disclosed in Japanese Patent Application Laid-Open No. 2009-074861, a mere switch according to the speed range between the calculation of the amount of travel of the vehicle by the image and the detection of the amount of travel of the vehicle by the vehicle speed sensor or the like cannot solve the problem in that the error included in the amount of travel of the vehicle with respect to the taken image is increased. Thus, there is a problem in that the accuracy of detecting an obstacle is reduced.

SUMMARY

In light of the foregoing, embodiments of the present invention is aimed to provide a vehicle travel amount estimation device that can obtain an accurate amount of travel of the vehicle with respect to a taken image. Embodiments of the present invention is also aimed to provide an obstacle detection device where the accuracy of detecting an obstacle is improved.

To solve the above-mentioned problem, a vehicle travel amount estimation device according to the present invention includes an imaging unit configured to take images of a periphery of the vehicle at predetermined time intervals, an image storing unit configured to store a plurality of images taken by the imaging unit, a travel amount calculation unit configured to calculate the amount of travel of the vehicle based on two taken images stored by the image storing unit, a travel amount detection unit configured to detect the amount of travel of the vehicle; and a travel amount determination unit configured to compare a first amount of travel calculated by the travel amount calculation unit with a second amount of travel detected by the travel amount detection unit in order to determine the first amount of travel to be the amount of travel of the vehicle when a difference between the first amount and the second amount is smaller than a predetermined value, and in order to determine the second amount of travel to be the amount of travel of the vehicle when the difference is larger than the predetermined value. The above-mentioned amount of travel is preferably at least one of the speed and the rotation angle of the vehicle.

It is preferable to use the first amount of travel with respect to the taken image when, for example, an obstacle is detected using the take image and the amount of travel of the vehicle. On the other hand, when the difference between the first amount of travel calculated by the travel amount calculation unit and the second amount of travel detected by the travel amount detection unit is smaller than a predetermined value, the gap between the timing when the image has been taken and the timing when the amount of travel has been detected is small, or the vehicle runs at low speed or at high speed. The accuracies of both of the first and the second amounts of travel are high. The first amount of travel is used in such cases so that an accurate amount of travel of the vehicle with respect to the taken image can be obtained.

Further, it is preferable that the timing when the above-mentioned imaging unit takes an image and the timing when the travel amount detection unit detects the amount of travel are not synchronization with each other. Thus, the imaging unit and the travel amount detection unit can be used regardless of the timing when an image is taken and the timing when the second amount of travel is detected. Thus, the accuracy of the amount of travel can be increased and the processes can be simplified in comparison with the case where the timings are considered.

It is preferable that the vehicle travel amount estimation device according to the present invention further includes a local image conversion unit configured to select two taken images stored by the image storing unit and move a part of one of the images using the amount of travel with respect to the image determined by the travel amount determination unit and an amount of travel obtained by increasing or decreasing the determined amount of travel within a predetermined range in order to convert the image for obtaining a converted image, wherein the travel amount calculation unit calculates correlations between the parts of a plurality of converted images obtained by the local image conversion unit according to a plurality of amounts of travel and the corresponding part of the other taken image in order to estimate an amount of travel with respect to a converted image having a maximum correlation value as an amount of travel of the vehicle with respect to the other image subsequently taken. As described above, checking whether an image obtained by converting (parallel moving or rotating) one of taken images according to a plurality of amounts of travel matches the other taken image can calculate an accurate amount of travel of the vehicle.

An obstacle detection device according to the present invention includes the above-mentioned vehicle travel amount estimation device, a whole image conversion unit configured to select two taken images stored by an image storing unit and convert a whole of one of the images by moving the whole image using an amount of travel with respect to the image determined by a travel amount determination unit, and an obstacle detection unit configured to compare the image obtained by the whole image conversion unit with another taken image in order to detect a mismatched region as an obstacle. Thus, an accurate amount of travel can be used to compare the old taken image and the new taken image. This can improve the accuracy of detecting an obstacle.

BRIEF DESCRIPTION OF THE DRAWINGS

FIG. 3 is a flowchart for showing an operation procedure in a travel amount calculation unit.

DETAILED DESCRIPTION

Figure 1:
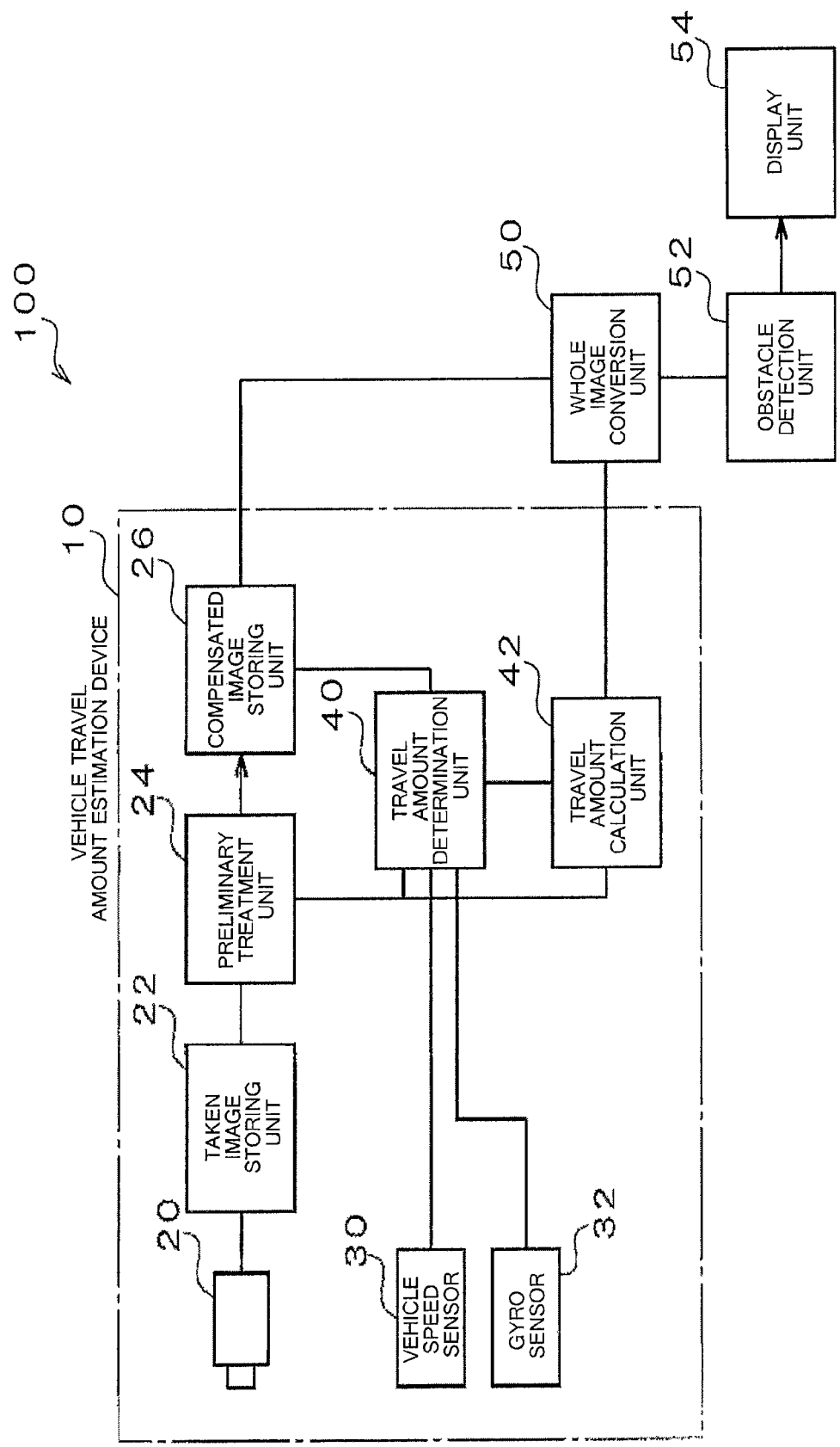
FIG. 1 is a view for showing the structure of an obstacle detection device according to an embodiment of the present invention.

An obstacle detection device according to an embodiment of the present invention will be described below with reference to the drawings. FIG. 1 is a view for showing the whole structure of an obstacle detection device according to an embodiment of the present invention. As shown in FIG. 1, an obstacle detection device 100 of the present embodiment includes a camera 20, a taken image storing unit 22, a preliminary treatment unit 24, a compensated image storing unit 26, a vehicle speed sensor 30, a gyro sensor 32, a travel amount determination unit 40, a travel amount calculation unit 42, a whole image conversion unit 50, an obstacle detection unit 52, and a display unit 54.

The camera 20 takes an image of the periphery of the vehicle having the camera. A wide-angle lens or a fish-eye lens is attached to the camera in order to take an image of a wider area. Note that it is not always necessary to use the wide-angle lens or the like. The camera 20 can be positioned at a location where the camera can take an image in a direction where an obstacle to be detected is found. The camera 20 is generally attached at the rear or the side of a vehicle. The taken image is stored in the taken image storing unit 22. On the assumption that 7.5 images are obtained per second, the taken images are stored in time intervals of 133 ms.

The preliminary treatment unit 24 reads the taken image stored in the taken image storing unit 22 to perform a preliminary treatment. The preliminary treatment includes, for example, (1) generating an image of which distortion has been compensated, (2) extracting a region (patch) based on the direction of the edge, (3) calculating the brightness dispersion at each region, and (4) determining the type of texture at each region. Setting regions on the image to find their brightness dispersion and referring to the types of their textures (for example, the pattern of the region) can extract the regions that are likely to correspond to the road surface. The N past images of which distortion have been compensated are stored in the compensated image storing unit 26 that reads and writes the images in a first-in first-out (FIFO) scheme.

The vehicle speed sensor 30 detects the running speed of a vehicle. For example, the vehicle speed sensor 30 outputs pulses at intervals of predetermined running distances of a vehicle. Note that, although the running speed of the vehicle is detected using the vehicle speed sensor 30 in the present embodiment, the running speed of the vehicle can be detected by another method, for example, based on the positioning data obtained using a GPS receiver.

The gyro sensor 32 detects the angular velocity of a vehicle. Note that, although the angular velocity of the vehicle is detected using the gyro sensor 32 in the present embodiment, the angular velocity of the vehicle can also be detected using a steering angle sensor configured to detect a steering angle of the front wheels when the steering wheel is turned.

The travel amount determination unit 40 determines the amount of travel of the vehicle with respect to the previous image (the image one image before the latest image). The amount of travel of the vehicle includes a speed V and an angular velocity co of the vehicle. The travel amount calculation unit 42 sets a plurality of candidate values of the amount of travel of the vehicle with respect to the latest image and calculates the correlation between each of the images obtained from converting (moving and rotating) a specific region (portion corresponding to the road surface) included in the latest image and the corresponding part in the past image one image before the latest image in order to calculate the amount of travel of the vehicle with respect to the latest image. The candidate values are set using the amount of travel of the vehicle with respect to the past image one image before the latest image determined by the travel amount determination unit 40. The detailed operations of the travel amount determination unit 40 and the travel amount calculation unit 42 will be described below.

A vehicle travel amount estimation device 10 includes the camera 20, the taken image storing unit 22, the preliminary treatment unit 24, the compensated image storing unit 26, the vehicle speed sensor 30, the gyro sensor 32, the travel amount determination unit 40, and the travel amount calculation unit 42.

The latest image and the past image one image before the latest image that have sequentially been taken (both of their distortions have been compensated) are read from the compensated image storing unit 26. The whole image conversion unit 50 converts the latest image using the amount of travel of the vehicle (the speed V(t), and the angular velocity ω(t)) calculated by the travel amount calculation unit 42.

The obstacle detection unit 52 compares the image obtained from an image conversion by the whole image conversion unit 50 with the past image one image before the latest image (the distortions of both of the images have already been compensated) and detects the mismatched region as an obstacle. The user is notified of the detection result using the display unit 54. For example, putting a specific color or the like on the region corresponding to the obstacle in the latest image notifies that an obstacle is found at that location.

The camera 20 corresponds to an imaging unit. The taken image storing unit 22 and the compensated image storing unit 26 correspond to an image storing unit. The travel amount calculation unit 42 corresponds to a travel amount calculation unit and a local image conversion unit. The vehicle speed sensor 30 and the gyro sensor 32 correspond to an travel amount detection unit. The travel amount determination unit 40 corresponds to a travel amount determination unit. The whole image conversion unit 50 corresponds to a whole image converting unit. The obstacle detection unit 52 corresponds to an obstacle detection unit.

Figure 2:
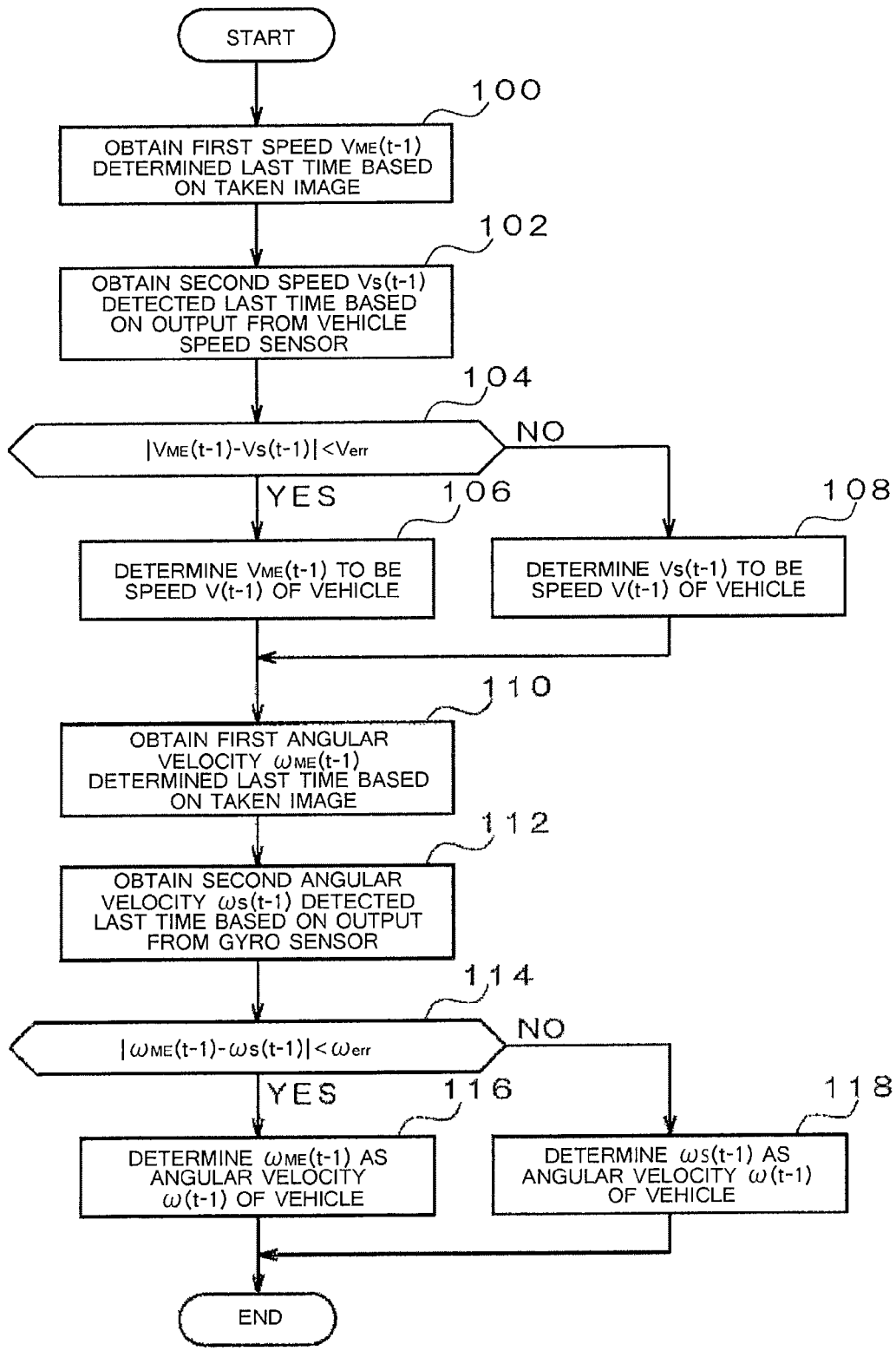
FIG. 2 is a flowchart showing an operation procedure in a travel amount determination unit.

The obstacle detection device 100 in the present embodiment has the above-mentioned structure. Next, the operations in the travel amount determination unit 40 and in the travel amount calculation unit 42 will be described. FIG. 2 is a flowchart for showing an operation procedure in the travel amount determination unit 40. First, the travel amount determination unit 40 obtains a vehicle speed (a first estimated speed) VME(t−1) (step 101). The vehicle speed has been determined by the travel amount determination unit 40 based on the past image one image before the latest image (the distortion of the image has been compensated and the image is stored in the compensated image storing unit 26). Further, the travel amount determination unit 40 obtains a vehicle speed (a second estimated speed) VS(t−1) that has been detected the last time based on the output from the vehicle speed sensor 30 (step 102). At that time, "that has been detected the last time" unit "that has been detected, using the vehicle speed sensor 30, at the nearest timing to the timing when the past image one image before the latest image has been taken". For example, on the assumption that the camera 20 takes images at intervals of 133 ms and the vehicle speed sensor 30 detects the speeds at intervals of 100 ms so that the operation for taking an image and the operation for detecting a speed are not in synchronization with each other, the vehicle speed that has been detected by the vehicle speed sensor 30 at the next timing come after the timing when the previous image has been taken becomes the above-mentioned vehicle speed VS(t−1) that has been detected the last time.

Next, the travel amount difference calculation unit 42 determines whether the absolute value of the difference between the first estimated speed VME(t−1), which is based on image capture, and the second estimated speed VS(t−1) which is based on sensor readings, is smaller than the threshold of the error Verr (whether the following expression is satisfied) (step 104).

$$|VME(t-1)-VS(t-1)|<Verr \qquad (1)$$

When the absolute value of the difference is smaller than the threshold of the error Verr, an affirmative judgment is executed. Then, the travel amount determination unit 40 then sets the first speed VME(t−1) found based on the taken images to be the actual determined speed V(t−1) of the vehicle (step 106).

Alternatively, when the absolute value of the difference is not smaller than the threshold of the error Verr (the absolute value of the difference is equal to or more than the threshold of the error Verr), a negative judgment is executed in step 104. The travel amount determination unit 40 sets the second speed VS(t−1) found using the vehicle speed sensor 30 to be the actual determined speed V(t−1) of the vehicle (step 108).

Next, the travel amount determination unit 40 obtains a vehicle angular velocity (a first estimated angular speed) ωME(t−1) that has been determined by the travel amount calculation unit 42 based on the past image one image before the latest image (the distortion of the image has been compensated and the image is stored in the compensated image storing unit 26) (step 110). Further, the travel amount determination unit 40 obtains a vehicle angular velocity (a second estimated angular velocity) ωS(t−1) detected the last time based on the output from the gyro sensor 32 (step 112). At that time, "that has been detected the last time" unit "that has been detected, using the gyro sensor 32, at the nearest timing to the timing when the past image one image before the latest image has been taken". For example, on the assumption that the camera 20 takes images at intervals of 133 ms and the gyro sensor 32 detects the angular velocities at intervals of 100 ms so that the operation for taking an image and the operation for detecting the angular velocity are not in synchronization with each other, the vehicle angular velocity that has been detected by the gyro sensor 32 at the next timing come after the timing when the previous image has been taken becomes the above-mentioned vehicle angular velocity ωS(t−1) that has been detected the last time.

Next, the travel amount difference calculation unit 42 determines whether the absolute value of the difference between the first angular velocity ωME(t−1), which is based on image capture, and the second angular velocity ωS(t−1), which is based on sensor readings, is smaller than the threshold of the error ωerr (whether the following expression is satisfied) (step 114).

$$|\omega ME(t-1)-\omega S(t-1)|<\omega err \qquad (2)$$

When the absolute value of the difference is smaller than the threshold of the error ωerr, an affirmative judgment is executed. The travel amount determination unit 40 then sets the first angular velocity ωME(t−1) found based on the image capture as the actual determined angular velocity ω(t−1) of the vehicle (step 116).

Alternatively, when the absolute value of the difference is not smaller than the threshold of the error ωerr (the absolute value of the difference is equal to or more than the threshold of the error (ωerr), a negative judgment is executed in step 114. The travel amount determination unit 40 then sets the second angular velocity ωS(t−1) found using the gyro sensor 32 as the actual determined angular velocity ω(t−1) of the vehicle (step 118).

FIG. 3 is a flowchart for showing an operation procedure in the travel amount calculation unit 42. First, the travel amount difference calculation unit 42 selects the region to be processed from the latest image (step 120). The selection is for extracting the local image corresponding to the road surface except the obstacle. The selection is performed based on the result from the preliminary process by the preliminary treatment unit 24 (the result from the calculation of the brightness dispersion at each region and the result from the determination of the texture type at each region).

Next, the travel amount difference calculation unit 42 determines a plurality of candidate values for the speed and the angular velocity with respect to the latest image (step 122). As described above, the travel amount determination unit 40 determines the speed V(t−1) and the angular velocity ω(t−1) of the vehicle with respect to the past image. It is considered that the speed V(t) and the angular velocity ω(t) of the vehicle with respect to the latest image is within a predetermined range from the speed V(t−1) and the angular velocity ω(t−1) of the vehicle with respect to the past image. Thus, a plurality of values centering on the speed and the angular velocity with respect to the past image are determined as candidate values for the speed and the angular velocity with respect to the latest image. For example, as for the speed, five candidate values centering on V(t−1) and including ±ΔV and ±2ΔV (V(t−1)−2ΔV, V(t−1)−ΔV, V(t−1), V(t−1)+ΔV, and V(t−1)+2ΔV) are determined. Further, as for the angular velocity, five candidate values centering on ω(t−1) and including ±Δω and ±2Δω (t−1)−2Δω, ω(t−1)−Δω, ω(t−1), ω(t−1)+Δω, and ω(t−1)+2Δω) are determined.

Next, the travel amount calculation unit 42 converts the region of the latest image selected in step 120 using the candidate values determined in step 122 (step 124). In the above-mentioned example, the five values have been determined as the candidate values for the speed and the five values have been determined as the candidate values for the angular velocity. Thus, there are 5×5=25 combinations of the speeds and the angular velocities. The region is parallel moved according to the speed of a combination and is rotated according to the angular velocity of the combination. In such a manner, 25 converted images are generated.

Next, the travel amount difference calculation unit 42 calculates the correlation between each of the 25 converted images and the corresponding region of the past image (step 126) in order to extract the candidate values of the speed and the angular velocity in which the correlation value is maximum (step 128). Each of the candidate values extracted in such a manner is calculated as the vehicle speed V(t) and the vehicle angular velocity ω(t) with respect to the latest image.

Generally, in the vehicle travel amount estimation device of a vehicle 10 according to the present embodiment, it is preferable to use the first speed VME(t−1) and the first angular velocity ωME(t−1) according to the taken image when, for example, an obstacle is detected using the amount of travel of the vehicle detected by the taken image, and the vehicle speed sensor 30 and the gyro sensor 32. On the other hand, when the differences between the first speed VME(t−1) and the second speed V(t−1) and between the first angular velocity ωME(t−1) and the second angular velocity ω(t−1) are smaller than the predetermined values (the thresholds of the errors Verr and (ωerr), the gap between the timing when the camera 20 takes an image and the timing when the vehicle speed sensor 30 or the gyro sensor 32 detects the speed or the angular velocity is small, or the vehicle runs at low speed or at high speed so that the accuracies of both of the calculation and the detection are high. The first speed and angular velocity are calculated by the travel amount difference calculation unit 42. The second speed and angular velocity are detected by the vehicle speed sensor 30 and the gyro sensor 32. The first speed VME(t−1) and the first angular velocity ωME(t−1) are used in such cases so that an accurate amount of travel of the vehicle with respect to a taken image can be obtained.

Further, it is not necessary to synchronize the timing when the camera 20 takes an image with the timing when the vehicle speed sensor 30 or the gyro sensor 32 detects the speed or the angular velocity so that the camera, the vehicle speed sensor and the gyro sensor 32 can be used regardless of the timings. Thus, the accuracy of the amount of travel can be increased and the processes can be simplified in comparison with the case where the timings are considered.

Further, using each of the candidate values for the speed and the angular velocity, the correlation between the image obtained by converting (parallel moving or rotating) an image (the latest image) and the other image (the past image) is calculated in order to check whether the image matches the other image. This can calculate the precise speed and angular velocity of the vehicle with respect to the latest image.

Further, in the obstacle detection device 100 according to the present embodiment, the latest image can be compared with the past image using the accurate amount of travel. This can increase the accuracy of detecting an obstacle.

Note that the present invention is not limited to the above-mentioned embodiment. Various modifications can be implemented within the scope of the gist of the present invention. For example, in the above-mentioned embodiment, to calculate the amount of travel of the vehicle (the speed and the angular velocity) or to detect an obstacle, the latest image is converted in order to calculate the correlation between the image obtained from the conversion and the corresponding region of the past image. However, the past image can be converted in order to calculate the correlation between the image obtained from the conversion and the corresponding region of the latest image.

Further, in the above-mentioned embodiment, when the candidate value of the amount of travel of the vehicle is determined in step 122 shown in FIG. 3, a plurality of candidate values are used for each of the speed and the angular velocity. When the obstacle detection is limited to the case where the vehicle runs straight, the candidate values are prepared only for the speed, and the fixed value can be used for the angular speed.

Further, in the above-mentioned embodiment, to estimate the amount of travel or to detect an obstacle, two images that have sequentially been taken are used. However, it is not always necessary to take the two images in series. As other cases, the present invention can be applied when two images that have been taken at different times are used.

As described above, according to the present invention, when the gap between the timing when a image is taken and the timing when the amount of travel is detected is small or when the vehicle runs at low speed or at high speed and the accuracies of both of the first and the second amounts of travel are high, an accurate amount of travel of the vehicle with respect to the taken image can be obtained using the first amount of travel calculated based on the taken image.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. A vehicle travel amount estimation device mounted on a vehicle, comprising:
   an imaging unit configured to capture images of a periphery of the vehicle at predetermined time intervals;
   an image storing unit operatively coupled to the imaging unit and configured to store a plurality of images captured by the imaging unit;
   a speed sensor configured to provide an indication of a speed of the vehicle;
   an angular velocity sensor configured to provide an indication of an angular velocity of the vehicle;
   a travel amount determination unit configured to determine a first estimated distance that the vehicle has traveled based on two captured images of the plurality of stored images, and configured to determine a second estimated distance that the vehicle has traveled based on data from the speed sensor and the angular velocity sensor;
   a travel amount difference calculation unit configured to compare the first estimated distance with the second estimated distance;
   wherein if the difference between the first estimated distance and the second estimated distance is smaller than a predetermined value, an actual travel distance of the vehicle is set equal to the first estimated distance; and
   wherein if the difference between the first estimated distance and the second estimated distance is not smaller than the predetermined value, the actual travel distance of the vehicle is set equal to the second estimated distance.

2. The vehicle travel amount estimation device according to claim 1,
   wherein the amount of travel is at least one of a speed and a rotation angle of the vehicle.

3. The vehicle travel amount estimation device according to claim 1,
   wherein a point in time when the imaging unit captures an image and a point in time when the travel amount determination unit detects the amount of travel are not synchronization with each other.

4. The vehicle travel amount estimation device according to claim 1, further comprising:
   a local image conversion unit configured to select two taken images stored by the image storing unit and move a part of one of the images using the amount of travel with respect to the image determined by the travel amount determination unit and an amount of travel obtained by increasing or decreasing the determined amount of travel within a predetermined range in order to convert the image for obtaining a converted image,
   wherein the travel amount calculation unit calculates correlations between the parts of a plurality of converted images obtained by the local image conversion unit according to a plurality of amounts of travel and the corresponding part of the other taken image in order to estimate an amount of travel with respect to a converted image having a maximum correlation value as an amount of travel of the vehicle with respect to the other image subsequently taken.

5. An obstacle detection device, comprising:
   a vehicle travel amount estimation device according to claim 4;
   a whole image conversion unit configured to select two taken images stored by an image storing unit and convert a whole of one of the images by moving the whole image using an amount of travel with respect to the image determined by an travel amount determination unit; and
   an obstacle detection unit configured to compare the image obtained by the whole image conversion unit with another taken image in order to detect a mismatched region as an obstacle.

6. A method for estimating a distance traveled by a vehicle, comprising the steps of:
   capture images of a periphery of the vehicle at predetermined time intervals;
   storing a plurality of images captured by the imaging unit;
   obtaining, by a speed sensor, an indication of a speed of the vehicle;
   obtaining, by an angular velocity sensor, an indication of an angular velocity of the vehicle;
   determining a first estimated distance that the vehicle has traveled based on two captured images of the plurality of stored images;
   determining a second estimated distance that the vehicle has traveled based on data from the speed sensor and the angular velocity sensor;
   calculating a difference between the first estimated distance and the second estimated distance;
   wherein if the difference between the first estimated distance and the second estimated distance is smaller than a predetermined value, setting an actual travel distance of the vehicle equal to the first estimated distance; and
   wherein if the difference between the first estimated distance and the second estimated distance is not smaller than the predetermined value, setting the actual travel distance of the vehicle equal to the second estimated distance.

* * * * *